W. H. HIESTAND.
TARGET TRAP.
APPLICATION FILED NOV. 15, 1909.
946,221.
Patented Jan. 11, 1910.
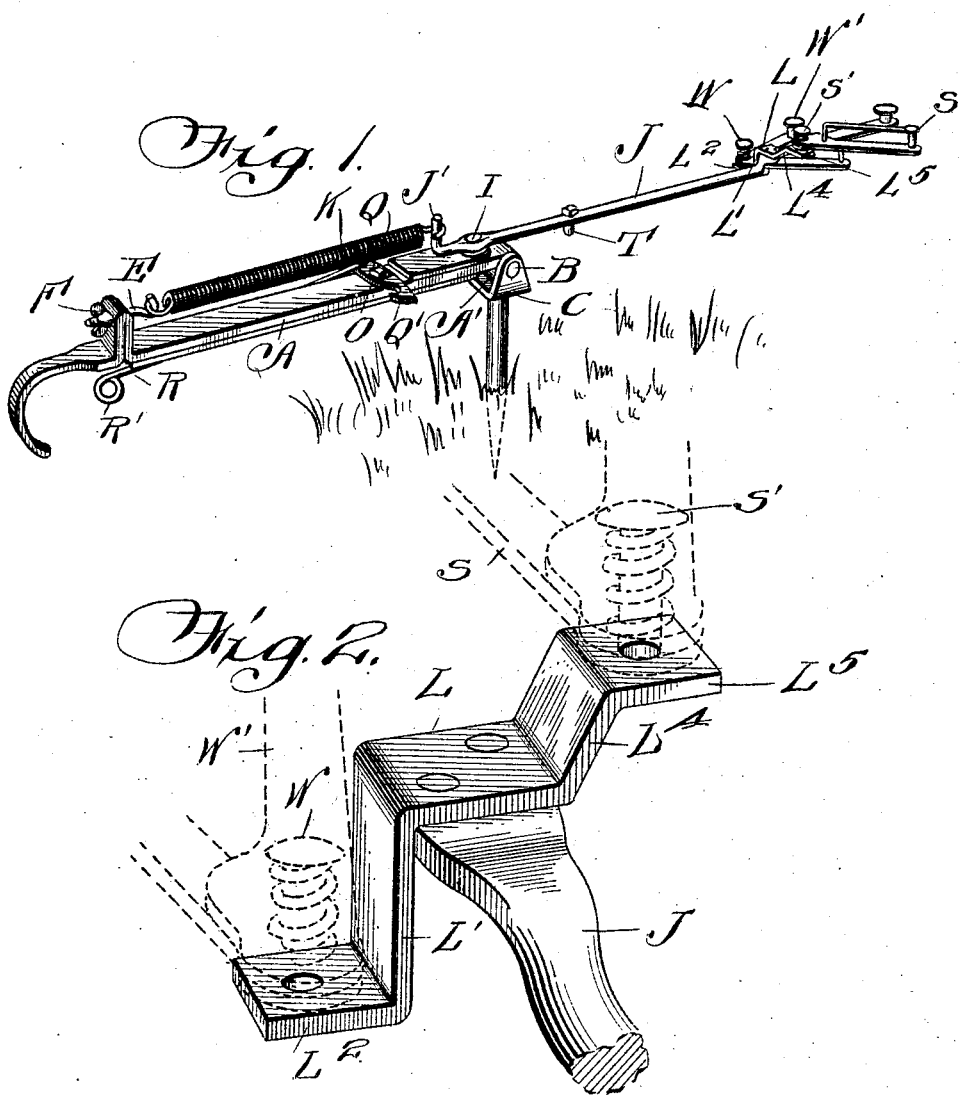

UNITED STATES PATENT OFFICE.

WILLIAM H. HIESTAND, OF CHICAGO, ILLINOIS.

TARGET-TRAP.

946,221.  Specification of Letters Patent.  Patented Jan. 11, 1910.

Application filed November 15, 1909. Serial No. 528,090.

*To all whom it may concern:*

Be it known that I, WILLIAM H. HIESTAND, a citizen of the United States, residing at Chicago, in the county of Cook and State of Illinois, have invented certain new and useful Improvements in Target-Traps; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in target traps and comprises a device of this nature having means for throwing two balls at the same time.

The invention comprises various details of construction and arrangements of parts which will be hereinafter fully described and then specifically defined in the appended claims.

I illustrate my invention in the accompanying drawings, in which:—

Figure 1 is a perspective view of a target trap embodying the features of my invention, and Fig. 2 is an enlarged detail view of the member which supports the carriers.

Reference now being had to the details of the drawings by letter, A designates a bar which is bent upon itself and formed into a cylindrical roll A′ through which a pivot B passes, and C designates a forked member in which said pivot is mounted, the pointed shank portion of said member being adapted to be inserted in any suitable supporting device for use. The bar is bent to form an upwardly projecting portion which is apertured for the reception of the hook E, one end of which is threaded to receive the winged nut F. One end of the bar A is bent to form a handle whereby it may be conveniently gripped when the operator desires to spring the trap.

Pivotally mounted upon the pin I is a throwing arm J, and K designates a spring which is fastened at one end to the hook E and its other end is connected to the hook J′ formed at the end of the throwing arm J.

Pivotally mounted upon the pin O carried by the bar A is a latch Q provided with a hook Q′ near its free end, and R designates a rod pivotally connected to the latch and provided with an angled end and formed into an eye R′ designed to receive the finger of an operator. Fixed to said bar J at right angles thereto is a switch bar L, one arm of which is bent at right angles at L′ and again at L², while its other arm is bent at an obtuse angle at two locations, designated respectively by letters L⁴ and L⁵.

Pivotally mounted upon a pin S′ is a spring engaging target holder S adapted to hold the target, and T is a pin carried by the throw arm and designed to engage the latch in the manner shown in dotted lines in Fig. 2 of the drawings to hold the trap set. A second pin, designated by letter W, is mounted upon one arm of the switch bar and a similar target holder W′ is mounted upon said pin W and is held by a spring and is of similar construction to the holder above referred to.

It will be noted that, by the provision of the peculiar shape of the switch bar, two carriers are provided and so arranged that a plurality of targets may be thrown simultaneously and one without interference to the other and with equal force.

In operation, the device being properly mounted is set by swinging the arm from the position shown in Fig. 1 in solid lines to that shown in dotted lines in Fig. 2 and in which position it may be set by means of the latch Q. The trap is sprung by the operator pulling upon the rod R in a direction toward the handle H and which movement will cause the latch to be released from the pin T, thereby allowing the spring K which is put under tension when the throw arm is set to cause the throw arm to be swung forcibly out to the position shown in Fig. 1, thereby giving an impetus to the targets, as will be readily understood.

What I claim to be new is:—

1. In combination with the throw arm and target trap, a cross piece fixed at right angles to said throw arm and having arms with portions disposed in parallel planes, and a target carrier mounted upon each arm of said cross piece, as set forth.

2. In combination with the throw arm and target trap, a cross piece fastened to said throw arm and bent at right angles at the opposite edges thereof, and having terminal portions which are in parallel planes one above the other, and a carrier mounted upon each of said portions of the cross piece which are parallel to each other, as set forth.

In testimony whereof I hereunto affix my signature in the presence of two witnesses.

WILLIAM H. HIESTAND.

Witnesses:
CHARLES F. MONAHAN,
OTTO F. CLOSIUS.